(12) United States Patent
Frigerio et al.

(10) Patent No.: US 11,015,584 B2
(45) Date of Patent: May 25, 2021

(54) SHAPE MEMORY ALLOY WIRE THERMOSTATIC TORSIONAL ACTUATOR AND VALVE INCLUDING IT

(71) Applicant: Saes Getters S.p.A., Lainate (IT)

(72) Inventors: Davide Frigerio, Inverigo (IT); Michele Scarlata, Caronno Pertusella (IT); Marco Citro, Varese (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 16/961,326

(22) PCT Filed: Mar. 11, 2019

(86) PCT No.: PCT/IB2019/051951
§ 371 (c)(1),
(2) Date: Jul. 10, 2020

(87) PCT Pub. No.: WO2019/175742
PCT Pub. Date: Sep. 19, 2019

(65) Prior Publication Data
US 2020/0340458 A1 Oct. 29, 2020

(30) Foreign Application Priority Data
Mar. 13, 2018 (IT) .......................... 102018000003494

(51) Int. Cl.
*F03G 7/06* (2006.01)

(52) U.S. Cl.
CPC .................................... *F03G 7/065* (2013.01)

(58) Field of Classification Search
CPC ............ F03G 7/065; G01K 5/483; G12B 1/00
See application file for complete search history.

(56) References Cited

U.S. PATENT DOCUMENTS

| | | | |
|---|---|---|---|
| 2005/0115235 A1* | 6/2005 | Mernoe | F03G 7/065 60/527 |
| 2006/0157659 A1* | 7/2006 | MacGregor | B60H 1/00871 251/11 |
| 2007/0119165 A1* | 5/2007 | Yson | G01K 5/483 60/527 |

(Continued)

FOREIGN PATENT DOCUMENTS

| | | |
|---|---|---|
| EP | 0 895 885 A2 | 2/1999 |
| GB | 2475890 A | 6/2011 |
| WO | WO 2004/097218 A2 | 11/2004 |

OTHER PUBLICATIONS

International Preliminary Report on Patentability, issued in PCT/IB2019/051951, dated Jun. 15, 2020.

(Continued)

*Primary Examiner* — Shafiq Mian
(74) *Attorney, Agent, or Firm* — Birch, Stewart, Kolasch & Birch, LLP

(57) ABSTRACT

Thermostatic shape memory alloy torsional actuator comprising a torsional shape memory alloy wire (1) connecting a stationary element (2) with a rotatable element (3) so as to move the latter between a rest position and an operating position, and a return element (11) acting on the rotatable element (3) so as to move the latter between said operating position and said rest position, and fluid control thermostatic valves comprising such torsional actuator.

19 Claims, 5 Drawing Sheets

(56) References Cited

U.S. PATENT DOCUMENTS

Figure 1A:
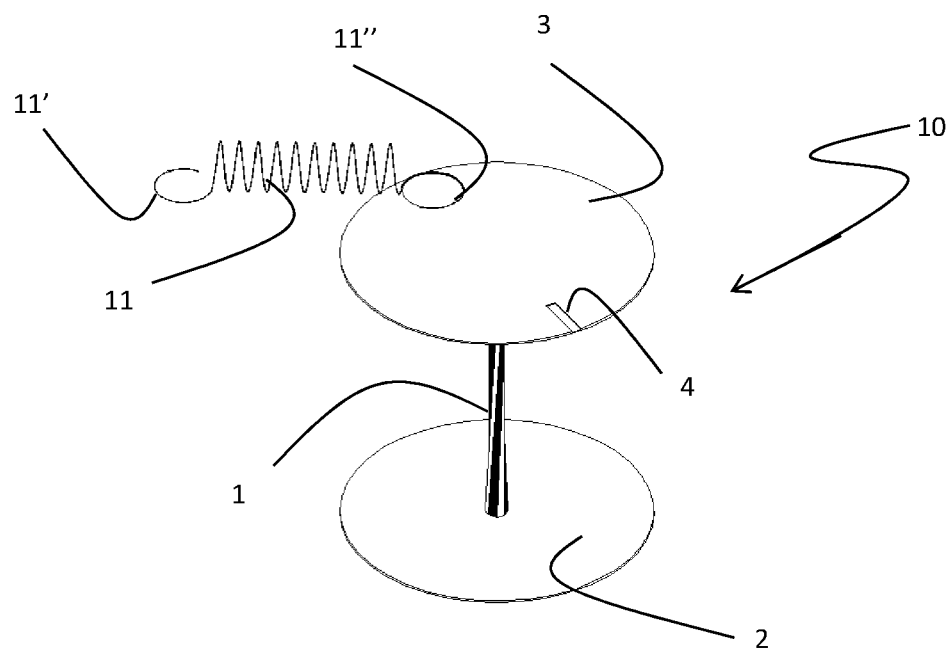

| | | | | | |
|---|---|---|---|---|---|
| 2010/0243077 | A1* | 9/2010 | Grimseth | ................ | E21B 34/00 |
| | | | | | 137/468 |
| 2011/0131971 | A1* | 6/2011 | Walls-Bruck | ........... | F03G 7/065 |
| | | | | | 60/527 |
| 2013/0227943 | A1* | 9/2013 | Mance | .................... | F03G 7/065 |
| | | | | | 60/528 |
| 2014/0060036 | A1* | 3/2014 | Gao | ......................... | F01P 7/10 |
| | | | | | 60/527 |
| 2017/0138354 | A1* | 5/2017 | Buttolph | ................ | F03G 7/065 |

OTHER PUBLICATIONS

International Search Report, issued in PCT/IB2019/051951, dated Jun. 18, 2019.
Written Opinion of the International Preliminary Examining Authority, issued in PCT/IB2019/051951, dated Feb. 7, 2020.
Written Opinion of the International Searching Authority, issued in PCT/IB2019/051951, dated Jun. 18, 2019.

* cited by examiner

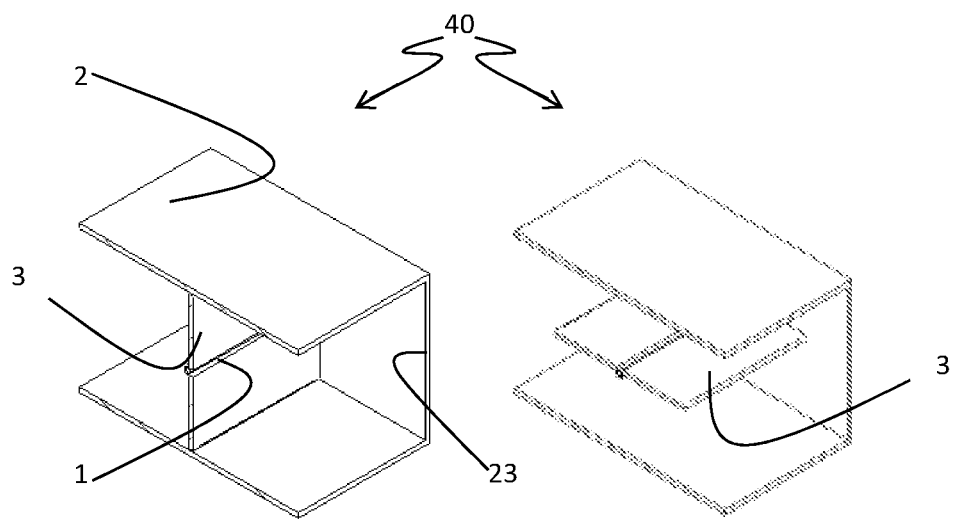
Fig. 4A  Fig. 4B
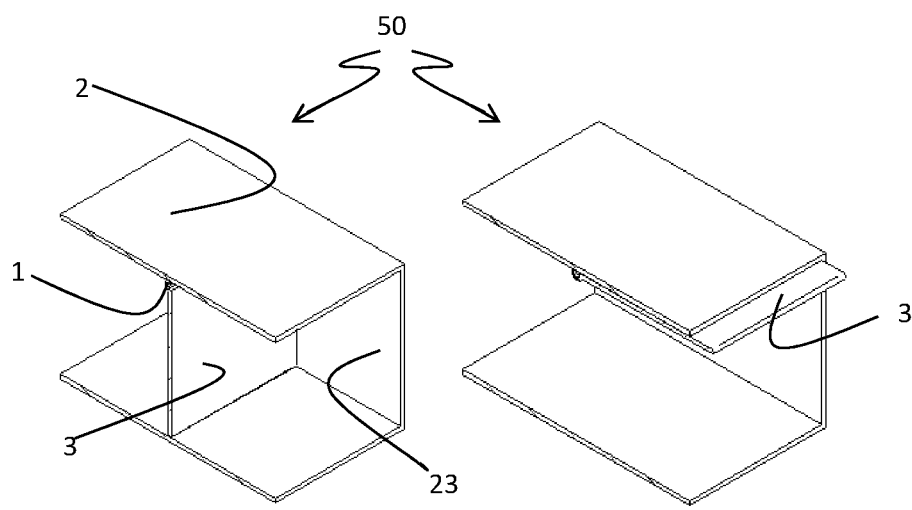
Fig. 5A  Fig. 5B

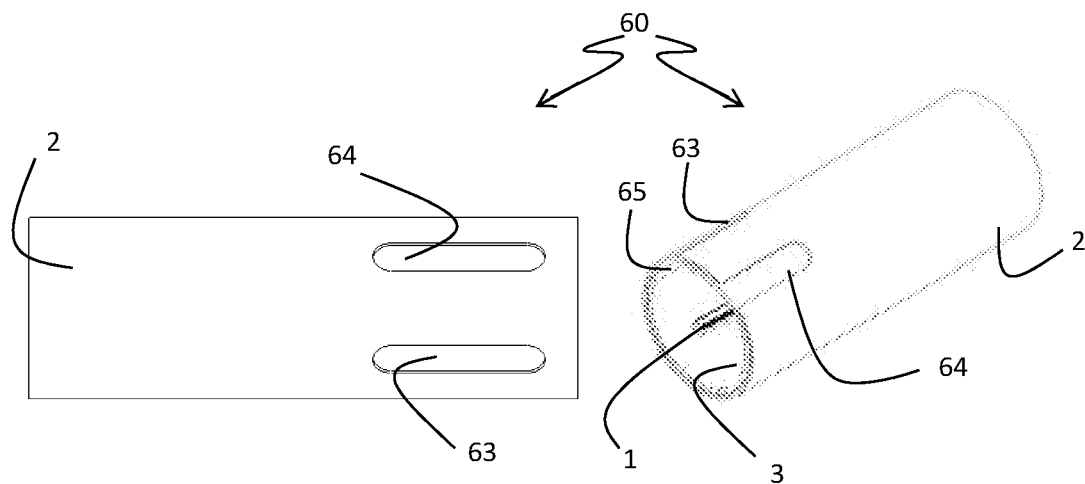
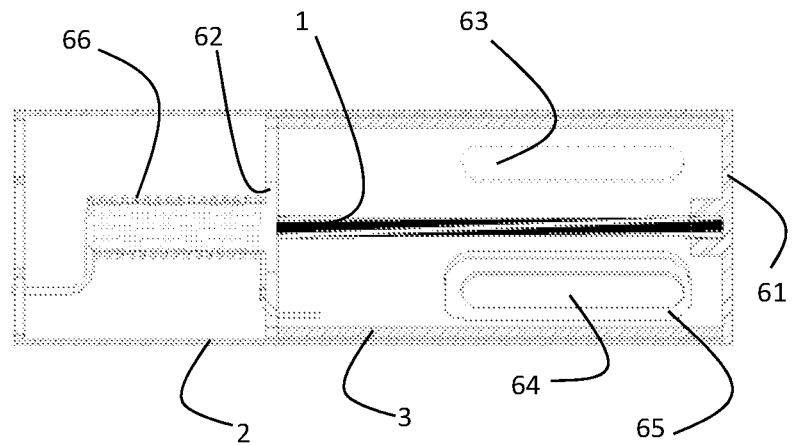
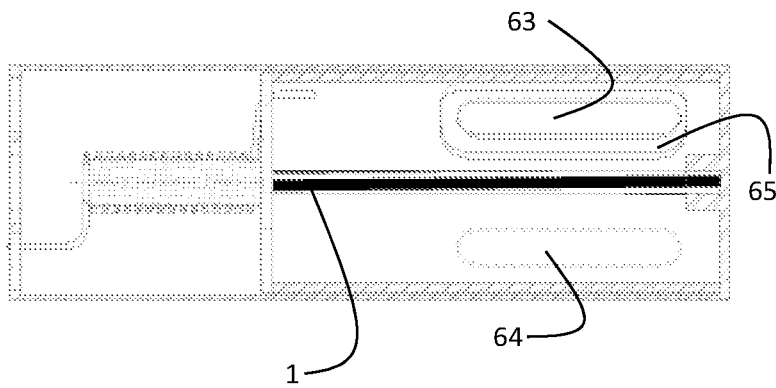
*Fig. 6A*
*Fig. 6B*
*Fig. 6C*
*Fig. 6D*

SHAPE MEMORY ALLOY WIRE THERMOSTATIC TORSIONAL ACTUATOR AND VALVE INCLUDING IT

The present invention is inherent to a shape memory alloy wire thermostatic torsional actuator and to thermostatic valves incorporating such an actuator.

The idea to exploit torsion recovery by shape memory elements to realize torsional actuators is known in principle since 1996 from the paper "Investigation of torsional shape memory alloy actuators" as published in the Proceedings Volume 2717, Smart Structures and Materials 1996: Smart Structures and Integrated Systems. This article focuses on the properties of SMA (Shape Memory Alloy) twisted rods, and differentiates their behavior with respect to the standard use of SMA-based actuators, where the SMA element is in form of wire or spring.

Torsional actuators made with a shape memory alloy torsion bar are also described in EP0895885 and EP2772647.

All of the above are therefore limited to the use of a massive and thick element, a shape memory alloy bar, that needs an external source of current to be activated.

Another alternate way to achieve rotational actuation is by means of linear actuation of a shape memory alloy wire wound and restrained on a cylindrical element (drum), as shown in the US patent application number 2017/0138354. Also in this case there is specified that the activation is achieved by Joule effect, moreover the drum is an element with a relevant encumbrance impeding its practical use in applications requiring lightweight solution and a free volume inside the actuator. Similar drawbacks are present also in the solution described in the US patent application number 2017/0121068 on rotational movement applied to container hinges.

In the article from Shim et al., "A smart soft actuator using a single shape memory alloy for twisting actuation", published in 2015 on Smart Material and Structures, there is disclosed a torsional actuator, whose actuation is current controlled, and described also the drawbacks of a low current supply for torsional actuation.

Purpose of the present invention is to overcome the drawbacks still present in the known art with a lighter SMA-based torsional actuator that does not require an external current supply to be actuated, and in a first aspect thereof consist in a thermostatic Shape Memory Alloy torsional actuator comprising:

- a stationary element,
- a rotatable element preferably provided with at least one engaging feature,
- a shape memory alloy element connecting the stationary element with the rotatable element so as to move the latter between a rest position and an operating position, the shape memory alloy element lying along the rotation axis of the rotatable element,
- a return element acting on the rotatable element so as to move the latter between said operating position and said rest position, characterized in that the shape memory alloy element is a torsional shape memory alloy wire with a diameter comprised between 0.3 and 3 mm, preferably between 0.4 and 2 mm.

The expression "lying along the rotation axis of the rotatable element" is to be intended to encompass also deviations from the ideal case of the torsional shape memory alloy wire centered onto the rotation axis, in particular a certain level of inclination is allowed. More specifically, the angle between the torsional shape memory alloy wire and the plane perpendicular to the rotatable element rotation axis, irrespective of the direction of inclination, can be comprised between 75° and 90° (90° representing the ideal situation of a SMA torsional wire parallel to the rotation axis). Also a certain degree of lateral displacement between the SMA torsional wire and the rotation axis is possible, in particular between 0 (perfect alignment—ideal condition) and 5 mm.

The above departures from the ideal conditions are encompassed in the definition of "lying along the rotation axis" and take into account the fact that the present invention refers to an actual system, i.e. to a "real world" actuator.

It is important to remark that since shape memory alloy torsional wires are real objects, and owing to their operating principle, they will depart from a circular cross-section, so the term "diameter" is to be intended as the diameter of the smallest enclosing circle along the whole length of the wire in both Martensite and Austenite phases.

It is also important to underline that in the context of the present invention and of the drawbacks of the know art the expression "thermostatic shape memory alloy torsional actuator" encompasses solutions whose actuation and controls are based solely on the temperature of the media surrounding/in contact with the torsional shape memory alloy wire and explicitly excludes any current supply/temperature control of the shape memory alloy element (torsional SMA wire).

Figure 1B:
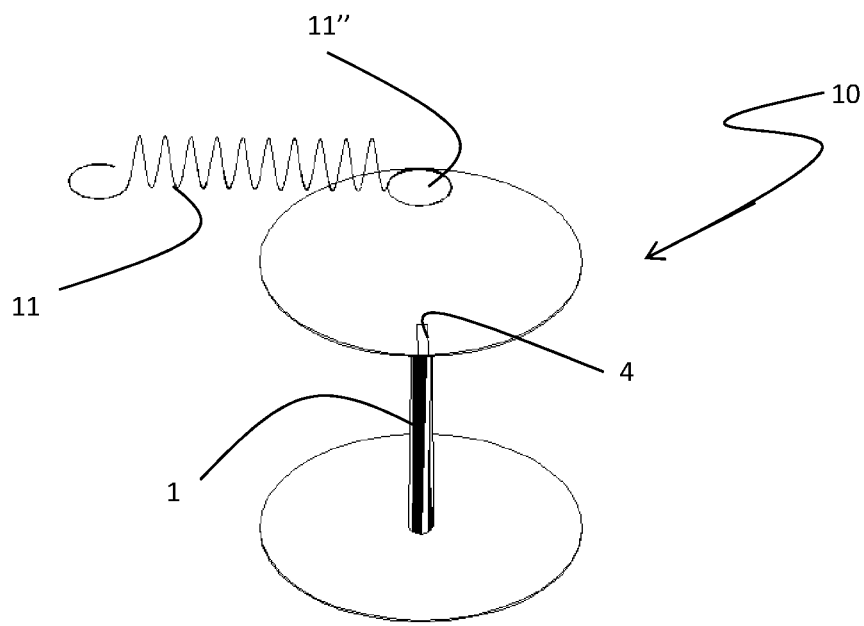
Figure 2A:
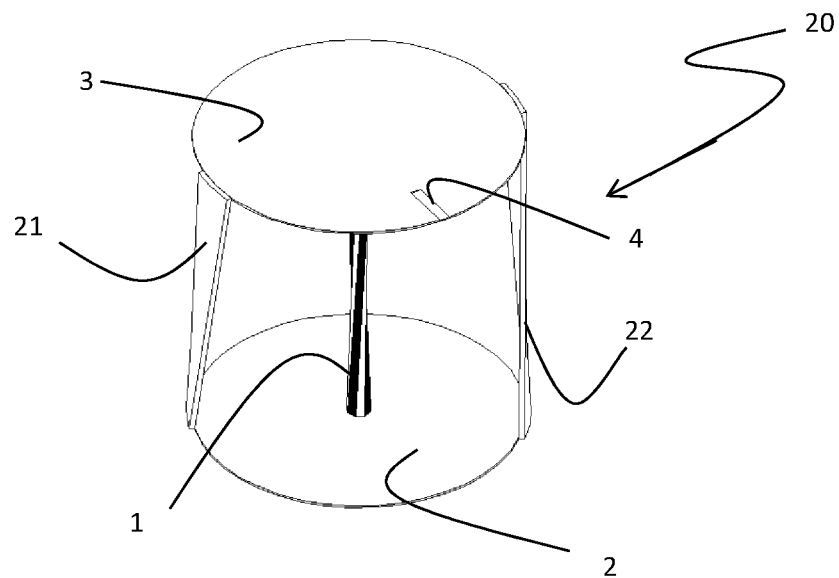
Figure 2B:
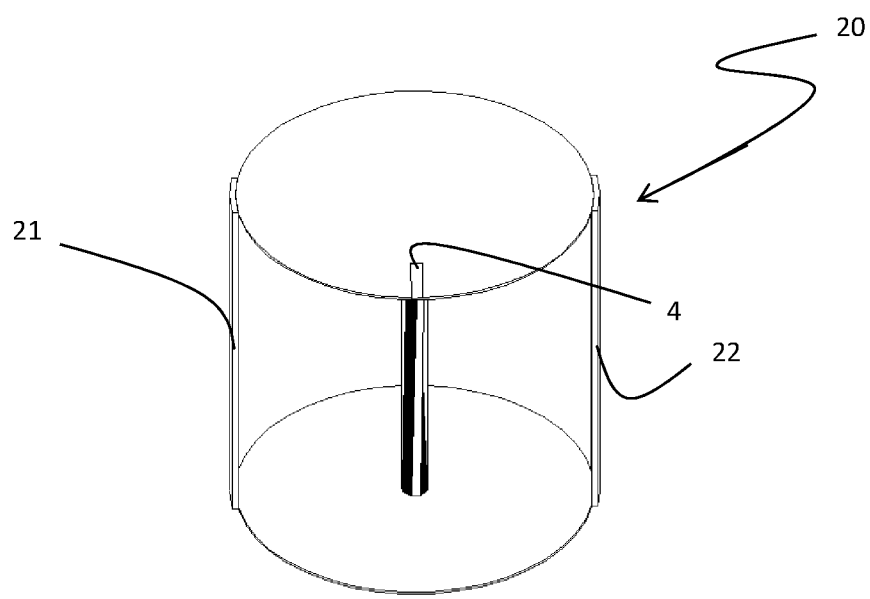
Figure 3B:
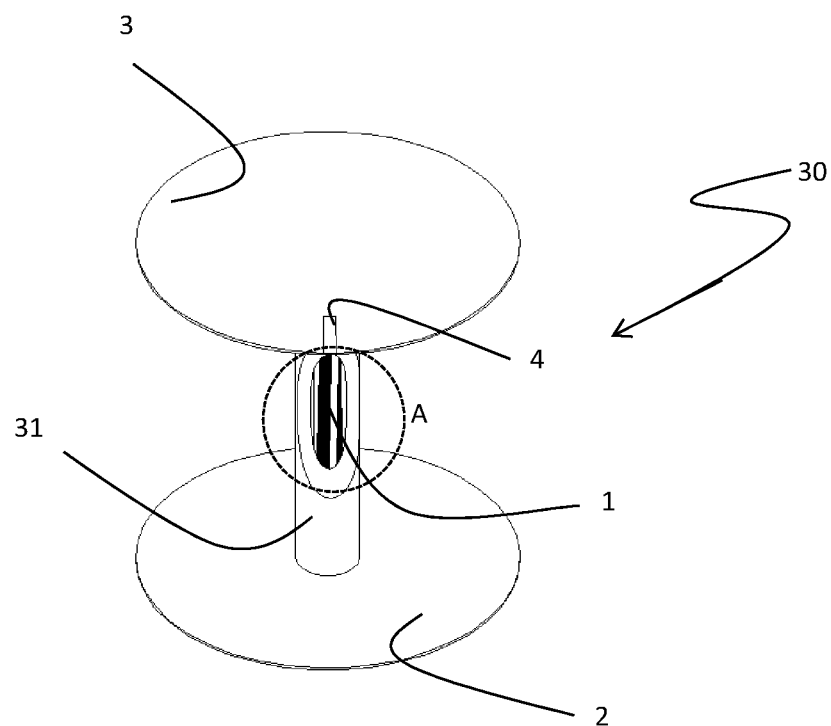
Figure 3A:
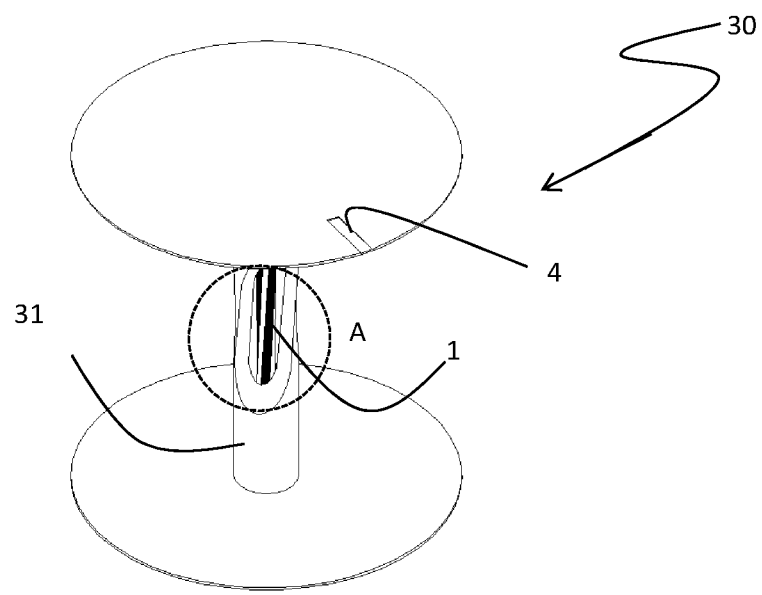

The invention will be further described with the help of the following figures wherein:

FIGS. 1A and 1B show a perspective view of a first embodiment of a thermostatic shape memory alloy torsional actuator according to the present invention, FIGS. 2A and 2B show a perspective view of a second embodiment of a thermostatic shape memory alloy torsional actuator according to the present invention, FIGS. 3A and 3B show a perspective view of a third embodiment of a thermostatic shape memory alloy torsional actuator according to the present invention, FIGS. 4A and 4B show a perspective view of a fourth embodiment of a thermostatic shape memory alloy torsional actuator according to the present invention, FIGS. 5A and 5B show a perspective view of a fifth embodiment of a thermostatic shape memory alloy torsional actuator according to the present invention, and FIGS. 6A-6D show different views of a sixth embodiment of a thermostatic shape memory alloy torsional actuator according to the present invention.

In the above referenced figures only the essential elements for the comprehension of the invention have been illustrated, moreover element dimensions and dimensional ratios in some cases have been altered to improve their readability.

The inventors have found that, unlike what is disclosed in the prior art, it is possible to make a shape memory alloy torsional actuator using a thin shape memory alloy wire, instead of a shape memory alloy bar, and that such a solution allows for automatic actuation and de-actuation of the SMA wire based on ambient/environmental/surrounding media temperature rather than relying on heating by Joule effect.

One of the most useful applications for this type of actuator is within thermostatic valves for fluid control, thermal actuators for reclosers, latches, locking and unlocking systems.

For the sake of clarity, with the terms "torsion" or "torsional" there is indicated the effect of the temperature increase on the SMA wire that leads to its twisting or un-twisting, while the terms "rotary" or "rotation" indicate the effect and movement imparted as a consequence of the SMA wire torsion.

Shape memory alloys are characterized by a transition between two phases, one stable at a lower temperature, the so called Martensite phase, and one stable at a higher temperature, the so called Austenite phase. A shape memory alloy is characterized by four temperatures, Mf, Ms, As, Af. Mf is the temperature below which the shape memory alloy is completely in the Martensite phase, i.e. it has a martensitic structure, Af is the temperature above which the shape memory alloy is fully in the Austenite phase, i.e. it has an austenitic structure. Ms and As indicate instead the shape memory alloy phase transition temperatures: Ms the transition starting temperature, upon cooling, from Austenite to Martensite, As the transition starting temperature, upon heating, from Martensite to Austenite. Elements such as wires, bars, sheets, etc. made of a shape memory alloy, also known as SMA elements, can be trained to change their shape when their temperature changes from below Mf to above Af, and viceversa. Processing and training of SMA elements are widely known procedures in the field, as exemplified by "Shape Memory Alloy Shape Training Tutorial" dating back to the Fall 2004 training section "ME559—Smart Materials and Structures".

SMA elements training and torsional behavior are known to a person of ordinary skill in the art, see for example the article "Improved design and performance of the SMA Torque Tube for the DARPA Smart Wing Program", published in 1999 as part of the SPIE conference on Industrial and Commercial Applications of Smart Structures, relative to torsion training of SMA tubes, and the 2012 University of Toledo thesis, Karbaschi, Zohreh, "Torsional behavior of nitinol: modeling and experimental evaluation" (2012) relative to torsion training of SMA wires.

FIGS. 1A and 1B show a perspective view of a first embodiment of a thermostatic shape memory alloy torsional actuator 10 according to the present invention. Torsional shape memory alloy wire 1 connects a lower stationary element 2 with an upper rotatable element 3. On the upper rotatable element 3 there is an engaging feature 4 and one ending 11" of a spring 11, whose other ending 11' is fixed/restrained to an element external to the actuator itself and not shown (it could be a case, a wall, a component of a system, etc.).

FIG. 1A shows torsional actuator 10 in a rest condition, while FIG. 1B shows the torsional actuator once activated, i.e. the torsional shape memory alloy temperature is at a temperature higher than Af. In FIG. 1B it is possible to appreciate the rotational displacement of the engaging feature 4, the elongation of spring 11 and the un-twisting of the shape memory alloy wire 1 from the twisted configuration of FIG. 1A. In actuator 10, the torsional shape memory alloy wire 1 moves the engaging feature 4 from its initial position of FIG. 1A (when the wire temperature is equal to or lower than As) to its final position of FIG. 1B (wire temperature equal to or higher than Af).

The purpose of spring 11 (the above-mentioned return element) is to favor the de-activation of actuator 10, i.e. the re-twisting of wire 1 in the situation shown and exemplified in FIG. 1A, once the shape memory alloy wire temperature goes below Ms.

As shown in FIGS. 1A and 1B, a preferred way to make the torsional actuators envision the use of a torsional shape memory alloy wire in a twisted configuration at a temperature equal to or lower than As that goes into/toward an un-twisted configuration at a temperature equal to or higher than Af, this in view of the fact that at a lower temperature, when the wire is in the Martensite state (cold configuration), the shape memory alloy wire is more easily worked (twisted).

An alternate thermostatic shape memory alloy torsional actuator 20 is shown in FIGS. 2A and 2B respectively showing actuator 20 in the rest condition (temperature of the torsional shape memory alloy wire 1 below As) and in the actuated condition (temperature of the torsional shape memory alloy wire 1 above Af). In this case the return element consists of two elastic strips 21, 22, disposed on opposite sides of actuator 20. Strips 21 and 22 have their extremities fixed at one end on the stationary element 2 and at the other end on the rotatable element 3.

In this configuration, the return element is autonomous from the external environment in terms of anchoring, i.e. it does not require a fixing point external to the torsional actuator itself.

A third embodiment of a thermostatic shape memory alloy torsional actuator 30 according to the present invention is shown in FIGS. 3A and 3B. In this case the torsional actuator 30 envisions the use, as return element, of an elastic sheath 31 surrounding the torsional shape memory alloy wire 1 and whose ends are fixed onto stationary element 2 and onto rotatable element 3. Therefore, also in this configuration the return element is autonomous from the external environment in terms of anchoring and does not require a fixing point external to the torsional actuator itself. Broken views A in both these figures better show the relationship between the torsional shape memory alloy torsional wire 1 and the elastic sheath 31.

All the embodiments shown in FIGS. 1A-1B, 2A-2B, 3A-3B have depicted a slot as engaging feature 4. This is just one of the possible solutions for such engaging feature 4 and the present invention is not limited to it. For example, a plurality of engaging features may be present on the rotatable element, 3, or the engaging feature 4 may be of a different type, for example embossed features such as pins, protrusions.

It is to be underlined that the presence of an engaging feature is optional as shown by the further embodiments described in the following that are not provided with such a feature.

Similarly stationary element 2 and rotatable element 3 have been shown with a circular geometry, but the invention is not limited to those, for example in a preferred alternate embodiment, part of the rotatable element 3 is a pulley, or has a toothed gear shape, even more preferably the rotatable element is a toothed gear.

Among other most interesting configurations there is the case when the rotatable element 3 is an empty rotating cylinder with the torsional shape memory alloy wire 1 connected to its base and lying along its rotation and symmetry axis (see FIGS. 6A-6D).

Another embodiment of a thermostatic shape memory alloy torsional actuator 40 is shown in FIGS. 4A and 4B. In this embodiment the stationary element is the actuator case 2, having at least a wall 23 to which the torsional shape memory alloy wire 1 is connected at a central portion thereof. In this case the rotatable element 3 is a flat laminar sheet with the torsional shape memory alloy wire 1 connected in its center. Actuation of the torsional shape memory alloy wire 1 moves element 3 from a vertical configuration (FIG. 4A) to a horizontal one (FIG. 4B).

Case 2 may have a wall opposite to wall 23 and the shape memory alloy wire 1 could also be connected to this second stationary element. In this case the un-twisting of the torsional SMA wire does not impart a rotational movement due to a force applied at the non-restrained extremity, but rotational movement is given by the wire deformation (return to an un-twisted state) applying to the rotatable element fixed along its length. Twisted and un-twisted torsional SMA wires are not explicitly indicated in FIGS. 4A and 4B.

Therefore for the purpose of the present invention one stationary element 2 must be present, but optionally also another one could be present as well. In this case the preferred return element (not shown) is an elastic sheath surrounding the torsional SMA wire.

FIGS. 5A and 5B show a fifth embodiment 50 that is a variant of embodiment 40. In this case the torsional shape memory alloy wire 1 is fixed in the uppermost part of wall 23 and rotatable element 3, and in this configuration it is important that the torsional shape memory alloy wire 1, stationary element/case 2, rotatable element 3 cooperatively act to define in one of the actuated/de-actuated states a flow intercepting geometry. Flow is allowed to pass once the torsional shape memory alloy wire 1 gets actuated and rotates the rotatable element 3 in the horizontal configuration shown in FIG. 5B.

Also for actuator 50 of FIGS. 5A-5B are valid the same considerations on the return element, rotation principle and optional second stationary element made with respect to FIGS. 4A and 4B.

As already mentioned, for the embodiments shown in FIGS. 4A-4B and 5A-5B the preferred return element is an elastic sheath (not represented in these figures) surrounding the torsional shape memory alloy wire 1. These embodiments are particularly useful for making thermostatic throttle valves.

A sixth embodiment 60 is exemplified in FIGS. 6A-6D, wherein FIGS. 6A and 6B respectively show a view from above and a cut-away perspective view of the actuator, while FIGS. 6C and 6D are longitudinal cross-sections of the actuator showing the effect of the actuation of the torsional shape memory alloy wire 1.

In this embodiment the stationary element is a cylindrical actuator case 2, open at one end and closed by a base 61 at the other end, and the rotatable element 3 is a cylindrical body rotatably fitting inside case 2 and similarly open at one end and provided with a base 62 at the other end. This base 62 is located opposite base 61 and equipped with passages for the fluid as well as an external peg on which a torsional spring 66 is mounted, said spring 66 having a proximal end engaged with base 62 whereas its distal end is engaged with case 2 so as to act as a rotational return element.

Two, preferably identical, longitudinal apertures 63, 64 are formed in case 2 at the same axial position and angularly spaced to act as flow diverters, and a preferably slightly larger aperture 65 is formed in the body of rotatable element 3 at a corresponding position to overlap with said apertures 63, 64. The torsional shape memory alloy wire 1 is connected between the centers of bases 61 and 62 such that its actuation results in the two apertures 63 and 64 being selectively and alternately opened through the angular movement of opening 65.

More specifically, FIG. 6C shows the shape memory alloy wire 1 in its rest (twisted) state, with aperture 64 opened and aperture 63 closed since aperture 65 is overlapped with the former, whereas in FIG. 6D the wire is actuated (un-twisted) such that aperture 64 is closed and aperture 63 is opened since aperture 65 is overlapped with the latter (as also shown in FIG. 6B).

It should be noted that case 2 of this embodiment could even serve as the case of a diverter valve, whereby the actuator could in practice embody substantially the entire valve.

As observable from the above exemplified embodiments, the invention is not limited or restricted to any specific return element, even though there is preferred the use of an elastic element such as springs, flexures, thin metal strips, elastic sheaths. It is also to underline that the present invention is not limited to an elastic return element, as other return means could be suitably used, for example a linear shape memory alloy wire, whose actuation provides the return force.

The elastic return element can be also a metal tube arranged concentrically to the actuator wire 1 and not in contact therewith (minimal distance with the wire to be at least 0.1 mm). The tube can be made of common metals with good elastic properties such as steel or aluminum as well as nickel-titanium alloys. Preferred is the use of tubes having a wall thickness comprised between 0.3 and 3 mm. In this case the thickness of the wall shall not be higher than the SMA wire diameter.

For the thin metal strips 21, 22 among the suitable materials there are, for example, steel and aluminum, preferably having a thickness comprised between 0.1 mm and 1 mm, and width comprised between 1 and 10 mm, while the length is determined by the distance between the stationary element and the rotatable element (i.e. essentially the length of the torsional shape memory alloy wire).

For the elastic sheath 31 among the suitable materials there are, for example, silicone rubber, elastomers like polybutadiene rubber and polyisoprene rubber, preferably with a thickness comprised between 1 and 10 mm.

It is important to underline that the elastic sheath 31 is essentially a cover in contact and fixed to the torsional shape memory alloy wire 1, as such it could be a stand-alone finite element mounted onto the torsional memory alloy wire 1 and then firmly fixed onto it, for example by heating a thermally shrinking sheath, or instead obtained by coating the torsional memory alloy wire 1 with a suitable precursor and then solidifying the latter.

Typically the thermostatic shape memory alloy torsional actuator according to the present invention is able to generate a torque at the wire extremity connected to the rotatable element comprised between 30 and 1200 N mm, this wide variation taking into account the possible coupling between the length and diameter of the torsional shape memory alloy wire, and how the relative force non-linearly scales.

In particular, the rate between the torque and the cubed diameter of the torsional shape memory alloy wire is preferably comprised between 3 and 100 MPa, more preferably between 10 and 60 MPa. This parameter has been expressed using the pressure measure unit as this quantity is directly proportional to the maximum tangential stress on the section of the material under torsion.

Preferably the torsional shape memory alloy wire has a length comprised between 5 mm and 100 mm.

The shape memory alloys used in a thermostatic shape memory alloy torsional actuator according to the present invention preferably have a Martensite phase temperature Mf equal to or lower than 40° C. and an Austenite phase temperature Af equal to or higher than 60° C.

Suitable alloys having such temperatures are Ni—Ti based alloys such as Nitinol, with or without additional elements, such as Hf, Nb, Pt, Cu. The proper choice of alloy and its characteristics are known to those skilled in the art, see for example:

http://memry.com/nitinol-iq/nitinol-fundamentals/transformation-temperatures

The present invention is not limited or restricted to a specific way to fix the torsional shape memory alloy wire to the stationary and rotatable element, even though preferred are crimping, plastic deformation, soldering. With regards to soldering, laser soldering is the most convenient.

When the thermostatic shape memory alloy actuators according to present invention are used in thermostatic valves, the torsional memory alloy wire 1 is preferably aligned with the fluid flow direction, this configuration having the advantage of avoiding a direct influence of pressure/flow rate on the valve shutter (rotatable element or element driven by it), being the valve shutter rotation axis parallel to the flow direction. This minimizes the influence of fluid pressure at different flow rates on the SMA actuator functional properties, such as activation temperature and angular displacement.

Another advantage is due to the fact that since the torsional shape memory alloy wire is "aligned" with the flow direction it is more quickly "wetted" by the fluid, thus enhancing heat transfer and the actuator response speed.

The technical effect of the diameter range claimed in the present invention is further illustrated by means of the following test data obtained from samples of wires within said range and outside it.

Torsional shape memory alloy wires of 30 mm length and different diameters have been tested by making a test assembly obtained by fixing one of the two wire extremities to a baseplate while the other wire extremity is allowed to rotate and has an indicator/handle glued thereon, consisting of a flat metallic sheet with dimension of 1.5 mm (width)×15 mm (length)×0.2 mm (thickness). The extremity of the torsional shape memory alloy wire is fixed in the center of the indicator/handle.

A manual twisting has been applied to the test assembly by rotating the handle by 180° and then the test assembly has been placed in a preheated air oven at a 120° C. temperature.

The test assembly is deemed to perform adequately if after 30 seconds there is at least a 10° rotation. The above test condition is a good representation of how the system will behave in a thermostatic actuator and therefore the suitability of the torsional wire to be employed.

The results are summarized in the below table

| Sample ID | SMA wire diameter (mm) | 180° Manual twisting @RT | Recovery after 30 s @120° C. |
|---|---|---|---|
| C1 | 0.1 | Not possible, loses structural integrity | — |
| S1 | 0.5 | Y | >150° |
| S2 | 1.5 | Y | >150° |
| S3 | 1.85 | Y | >150° |
| C2 | 3.5 | Y | <10° |

The above table shows that only the SMA wires of samples S1-S3 with the features of present invention are suitable to be used in a thermostatic torsional actuator. In particular, the comparative sample C1 does not have enough mechanical strength and the wire loses its geometrical configuration as it bends over, therefore the test assembly is no more encompassed by claim 1 as it violates the requirement of having the wire lying along the rotation axis of the rotatable element, while the comparative sample C2 shows an excessive inertia (i.e. a too slow response if used in a fully assembled actuator).

The invention claimed is:

1. A thermostatic shape memory alloy torsional actuator (10; 20; 30; 40; 50; 60) comprising:
   a stationary element (2),
   a rotatable element (3), provided with at least one engaging feature (4),
   a shape memory alloy element having a first end connected to said stationary element (2) and a second end connected to said rotatable element (3), the first end being opposite to the second end, the shape memory alloy element being configured to move the rotatable element between a rest position and an operating position, said shape memory alloy element lying along the rotation axis of the rotatable element (3) such that the angle between the shape memory alloy element and the plane perpendicular to the rotatable element rotation axis, irrespective of the direction of inclination, is between 75° and 90° and that the lateral displacement between the shape memory alloy element and the rotation axis is not more than 5 mm,
   a return element (11; 21, 22; 31; 66) acting on the rotatable element (3) so as to move the latter between said operating position and said rest position,
   wherein the shape memory alloy element is a torsional shape memory alloy wire (1) with a diameter comprised between 0.3 and 3 mm, whose actuation is based solely on the temperature of the media surrounding/in contact with it and leads to its twisting or un-twisting, and in that the actuator (10; 20; 30; 40; 50; 60) does not include any means for current supply/temperature control of the shape memory alloy element.

2. A thermostatic shape memory alloy torsional actuator (10; 20; 30; 40; 50; 60) according to claim 1, wherein the length of the torsional shape memory alloy wire (1) is between 5 mm and 100 mm.

3. A thermostatic shape memory alloy torsional actuator (10; 20; 30; 40; 50; 60) according to claim 1, wherein the rate between the torque and the cubed diameter of the torsional shape memory alloy wire (1) is between 3 and 100 MPa.

4. A thermostatic shape memory alloy torsional actuator (10; 20; 30; 40; 50; 60) according to claim 1, wherein the material of the torsional shape memory alloy wire (1) has a Martensite phase temperature Mf equal to or lower than 40° C. and an Austenite phase temperature Af equal to or higher than 60° C.

5. A thermostatic shape memory alloy torsional actuator (10; 20; 30; 40; 50; 60) according to claim 4, wherein the material of the torsional shape memory alloy wire (1) is chosen from Ni—Ti alloys containing one or more of Hf, Nb, Pt, Cu.

6. A thermostatic shape memory alloy torsional actuator (10; 20; 30; 40; 50; 60) according to claim 1, wherein the ends of the shape memory alloy wire (1) are fixed by one of crimping, plastic deformation, soldering.

7. A thermostatic shape memory alloy torsional actuator (10; 20; 30; 40; 50; 60) according to claim 1, wherein the return element (11; 21, 22; 31; 66) is an elastic element.

8. A thermostatic shape memory alloy torsional actuator (10; 20; 30; 40; 50; 60) according to claim 7, wherein the return element is chosen from flexures, springs (11; 66), thin metal strips (21, 22), sheaths (31), metallic tubes.

9. A thermostatic shape memory alloy torsional actuator (20; 30; 40; 50; 60) according to claim 7, wherein the elastic return element (21, 22; 31; 66) is fixed between the rotatable element (3) and the stationary element (2).

10. A thermostatic shape memory alloy torsional actuator (10) according to claim 7, wherein the elastic return element (11) is fixed between the rotatable element (3) and an element external to the actuator.

11. A thermostatic shape memory torsional actuator (10; 20; 30) according to claim 1, wherein the at least one engaging feature (4) present on the rotatable element (3) is an engaging pin or slot.

12. A thermostatic shape memory alloy torsional actuator (60) according to claim 1, wherein the stationary element (2) is a cylindrical case, open at one end and closed at the other end by a first base (61), the rotatable element (3) is a cylindrical body rotatably fitting inside the stationary element (2) and similarly open at one end and provided at the other end with a second base (62), that is located opposite said first base (61) and equipped with passages for fluid, the return element is a torsional spring (66) arranged between the rotatable element (3) and the stationary element (2), and the torsional shape memory alloy wire (1) is connected between the centers of said bases (61, 62), two longitudinal apertures (63, 64) being formed in the stationary element (2) at the same axial position and angularly spaced and an aperture (65) being formed in the rotatable element (3) at a corresponding position to alternately overlap with said apertures (63, 64) in the stationary element (2) upon activation and de-activation of the torsional shape memory alloy wire (1).

13. A fluid control thermostatic valve comprising a thermostatic shape memory alloy torsional actuator (10; 20; 30; 40; 50; 60), the thermostatic shape memory alloy torsional actuator (10; 20; 30; 40; 50; 60) comprising:
a stationary element (2),
a rotatable element (3) provided with at least one engaging feature (4),
a shape memory alloy element connecting said stationary element (2) with said rotatable element (3) so as to move the latter between a rest position and an operating position, said shape memory alloy element lying along the rotation axis of the rotatable element (3) such that the angle between the shape memory alloy element and the plane perpendicular to the rotatable element rotation axis, irrespective of the direction of inclination, is between 75° and 90° and that the lateral displacement between the shape memory alloy element and the rotation axis is not more than 5 mm,
a return element (11; 21, 22; 31; 66) acting on the rotatable element (3) so as to move the latter between said operating position and said rest position,
wherein the shape memory alloy element is a torsional shape memory alloy wire (1) with a diameter comprised between 0.3 and 3 mm, whose actuation is based solely on the temperature of the media surrounding/in contact with it and leads to its twisting or un-twisting, and in that the actuator (10; 20; 30; 40; 50; 60) does not include any means for current supply/temperature control of the shape memory alloy element.

14. A fluid control thermostatic valve according to claim 13, wherein the fluid flow direction is essentially parallel to or aligned with the torsional shape memory alloy wire (1).

15. A thermostatic shape memory alloy torsional actuator (10; 20; 30; 40; 50; 60), comprising:
a stationary element (2),
a rotatable element (3) provided with at least one engaging feature (4),
a shape memory alloy element connecting said stationary element (2) with said rotatable element (3) so as to move the latter between a rest position and an operating position, said shape memory alloy element lying along the rotation axis of the rotatable element (3) such that the angle between the shape memory alloy element and the plane perpendicular to the rotatable element rotation axis, irrespective of the direction of inclination, is between 75° and 90° and that the lateral displacement between the shape memory alloy element and the rotation axis is not more than 5 mm,
a return element (11; 21, 22; 31; 66) acting on the rotatable element (3) so as to move the latter between said operating position and said rest position,
wherein the shape memory alloy element is a torsional shape memory alloy wire (1) with a diameter comprised between 0.3 and 3 mm, whose actuation is based solely on the temperature of the media surrounding/in contact with it and leads to its twisting or un-twisting, and in that the actuator (10; 20; 30; 40; 50; 60) does not include any means for current supply/temperature control of the shape memory alloy element,
wherein the length of the torsional shape memory alloy wire (1) is between 5 mm and 100 mm, and
wherein the rate between the torque and the cubed diameter of the torsional shape memory alloy wire (1) is between 3 and 100 MPa.

16. A thermostatic shape memory alloy torsional actuator (10; 20; 30; 40; 50; 60) according to claim 2, wherein the material of the torsional shape memory alloy wire (1) has a Martensite phase temperature Mf equal to or lower than 40° C. and an Austenite phase temperature Af equal to or higher than 60° C.

17. A thermostatic shape memory alloy torsional actuator (10; 20; 30; 40; 50; 60) according to claim 3, wherein the material of the torsional shape memory alloy wire (1) has a Martensite phase temperature Mf equal to or lower than 40° C. and an Austenite phase temperature Af equal to or higher than 60° C.

18. A thermostatic shape memory alloy torsional actuator (10; 20; 30; 40; 50; 60) according to claim 2, wherein the ends of the shape memory alloy wire (1) are fixed by one of crimping, plastic deformation, soldering.

19. A thermostatic shape memory alloy torsional actuator (10; 20; 30; 40; 50; 60) according to claim 3, wherein the ends of the shape memory alloy wire (1) are fixed by one of crimping, plastic deformation, soldering.

* * * * *